(12) United States Patent
Kilickiran et al.

(10) Patent No.: US 8,038,902 B2
(45) Date of Patent: Oct. 18, 2011

(54) COMPOSITION COMPRISING AT LEAST ONE TYPE OF LIQUID CRYSTAL

(75) Inventors: Pinar Kilickiran, Stuttgart (DE); Akira Masutani, Fellbach (DE); Anthony Roberts, Stuttgart (DE); Gabriele Nelles, Stuttgart (DE); Akio Yasuda, Tokyo (JP); Andrzej Tadeusiak, Lancashire (GB); Graham Sandford, Durham (GB)

(73) Assignee: Sony Deutschland GmbH, Berlin (DE)

( * ) Notice: Subject to any disclaimer, the term of this patent is extended or adjusted under 35 U.S.C. 154(b) by 12 days.

(21) Appl. No.: 12/295,476

(22) PCT Filed: Mar. 30, 2007

(86) PCT No.: PCT/EP2007/002902
§ 371 (c)(1),
(2), (4) Date: May 21, 2009

(87) PCT Pub. No.: WO2007/112985
PCT Pub. Date: Oct. 11, 2007

(65) Prior Publication Data
US 2009/0244443 A1    Oct. 1, 2009

(30) Foreign Application Priority Data

Mar. 31, 2006  (EP) ................................. 06006898
Feb. 28, 2007  (EP) ................................. 07004161

(51) Int. Cl.
*C09K 19/00* (2006.01)
*C09K 19/06* (2006.01)
*C09K 19/52* (2006.01)
*G02F 1/1333* (2006.01)

(52) U.S. Cl. ............... 252/299.01; 252/299.6; 430/20; 428/1.1; 428/1.3; 349/1; 349/56

(58) Field of Classification Search ............. 252/299.01, 252/299.6; 430/20; 428/1.1, 1.3; 349/1, 349/56
See application file for complete search history.

(56) References Cited

U.S. PATENT DOCUMENTS

| | | | |
|---|---|---|---|
| 3,983,049 | A | 9/1976 | Aftergut et al. |
| 4,287,085 | A | 9/1981 | Takei et al. |
| 4,482,472 | A | 11/1984 | Carr et al. |
| 6,366,330 | B1 | 4/2002 | Khan et al. |
| 2003/0092930 | A1 | 5/2003 | Schmidt et al. |
| 2007/0228324 | A1* | 10/2007 | Kilickiran et al. ....... 252/299.01 |

FOREIGN PATENT DOCUMENTS

| | | |
|---|---|---|
| EP | 0 072 204 | 2/1983 |
| EP | 1 038 941 A1 | 9/2000 |
| EP | 1 197 791 A2 | 4/2002 |
| EP | 1 439 215 | 7/2004 |
| EP | 1 541 661 | 6/2005 |
| JP | 50-151782 | 12/1975 |
| JP | 64-9959 | 1/1989 |
| JP | 2004-199056 | 7/2004 |

OTHER PUBLICATIONS

Wouter Schuddeboom, et al., "Excited-State Dipole Moments of Dual Fluorescent 4-(Dialkylamino)benzonitriles, Influence of Alkyl Chain Length and Effective Solvent Polarity", Journal of Physical Chemistry, vol. 96, No. 26, 1992, pp. 10809-10819.

Pinar Kilickiran, et al., "Halogeneted Non-Planar Dopants for Fast Response Liquid Crystals", Digest of Technical Papers Society for Information Display, 17.4, May 23-25, 2007, pp. 999-1002.

* cited by examiner

*Primary Examiner* — Geraldina Visconti
(74) *Attorney, Agent, or Firm* — Oblon, Spivak, McClelland, Maier & Neustadt, L.L.P.

(57) ABSTRACT

The present invention relates to a composition comprising at least one type of liquid crystal, to a liquid crystal cell and liquid crystal display device comprising such composition and to a method of preparing such a composition and/or such a liquid crystal cell.

28 Claims, 11 Drawing Sheets

Figure 1:
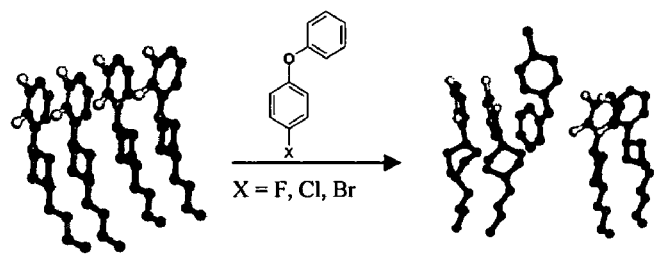

Theoretical model which simulates a halogenated diarylether molecule penetrating between two liquid crystal molecules, separating them slightly.

A  B  C

Diarylethers with different substitution pattern

A  B  C

Geometry optimized structures of three
diarylether derivatives. Compound A is the most
non-planar.

A  B  C

Doping LCs with Compound A gives the fastest response times.

Improved grey scale switching of
−LC by doping with compound A

No Change in black level
upon doping with compound

Non-planar 4-Fluoro benzophenone

A

4-Fluoro benzophenone(FPhCOPh) doped –LC shows faster rise times than the pure –LC

B

4-Fluoro benzophenone(FPhCOPh) doped –LC shows faster grey scale switching (faster response at V10).

Schemes for compounds in accordance with the present invention

Different types of response times

COMPOSITION COMPRISING AT LEAST ONE TYPE OF LIQUID CRYSTAL

The present invention relates to a composition comprising at least one type of liquid crystal, to a liquid crystal cell and liquid crystal display device comprising such composition and to a method of preparing such a composition and/or such a liquid crystal cell.

Current electronic device display technologies require displays with high brightness and contrast, low power consumption, and very fast response times. The state of the art liquid crystals used in such displays very often do not fulfill all these requirements. Numerous studies have been carried out towards this end wherein either new liquid crystal mixtures were developed or additives, such as inorganic micro- or nano-particles, organic hydrogen-bond or complex forming materials were admixed to the existing liquid crystals to improve their properties (Buchnev et al., 2005, Journal of the SID 13/9, EP 1 213 293, EP 1 038 941, EP 1 197 791 and EP 1 541 661). The additives reported so far do not fulfill all requirements, such as improving the response times without disturbing the contrast ratio, or reducing the switching voltage whilst the response speed is still kept high and the contrast ratio remains unchanged. Another important parameter is the voltage holding ratio of the liquid crystal cells which should be kept high, ideally higher than 95%. There are currently no reports on this important property of prior art liquid crystal mixtures when additives are admixed to these mixtures to improve their properties.

Accordingly, it was an object of the present invention to provide for liquid crystal compositions allowing the production of liquid crystal cells wherein the response times are fast, the liquid crystal alignment at the boundary surfaces remain unchanged such that no changes are required in alignment layers, the off transmittance remains same, the contrast ratio and brightness remain high whilst, at the same time, the voltage holding ratios are kept high. It was also an object of the present invention to provide for a liquid crystal composition allowing the production of liquid crystal cells wherein a high brightness and contrast ratio, i.e. a high on-state transmittance and a low off-state transmittance is maintained.

The objects of the present invention are solved by a composition comprising at least one type of liquid crystal and at least one type of non-planar aromatic compound.

In one embodiment said non-planar aromatic compound is represented by formula 1

$$Ar^1—X—Ar^2 \quad \text{(Formula 1)}$$

wherein each of $Ar^1$ and $Ar^2$ is an aromatic ring system, and X is a bridging group selected from the group comprising O, S, NH, carbonyl, —$C_nH_{2n}$—, —CO—$C_nH_{2n}$—, —O—$C_nH_{2n}$—, with n=1 to 20, —$C_pH_{2p}$—$(CH_mF_o)_a$—, with, p=0 to 20, m=0 to 1, o=2−m, a=1 to 20, —$C_pH_{2p}$—$(CH_mF_o)_a$—$C_qH_{2q}$—, with, p=0 to 20, q=0 to 20, m=0 to 1, o=2−m, a=1 to 20, —$C_pH_{2p}$—$[CH_mF_z$—$(CF_3)_y]_a$—$C_qH_{2q}$—, with, p=0 to 20, q=0 to 20, m=0 to 1, z=1−m, y=1 if m or z=0, y=2 if both m and z=0, a=1 to 20, —$C_nH_{2n}$—O—$C_pH_{2p}$—$(CH_mF_o)_a$—, with n=0 to 20, p=0 to 20, m=0 to 1, o=2−m, a=1 to 20, —$C_nH_{2n}$—O—$(CH_mF_o)_a$—$C_pH_{2p}$—, with n=0 to 20, p=0 to 20, m=0 to 1, o=2−m, a=1 to 20, —$C_nH_{2n}$—O—$C_pH_{2p}$—$(CH_mF_o)_a$—$C_qH_{2q}$—, with n=0 to 20, q=0 to 20, p=0 to 20, m=0 to 1, o=2−m, a=1 to 20, —$C_nH_{2n}$—S—$C_pH_{2p}$—$(CH_mF_o)_a$—, with n=0 to 20, p=0 to 20, m=0 to 1, o=2−m, a=1 to 20, —$C_nH_{2n}$—S—$(CH_mF_o)_a$—$C_pH_{2p}$—, with n=0 to 20, p=0 to 20, m=0 to 1, o=2−m, a=1 to 20, —$C_nH_{2n}$—S—$C_pH_{2p}$—$(CH_mF_o)_a$—$C_qH_{2q}$—, with n=0 to 20, q=0 to 20, p=0 to 20, m=0 to 1, o=2−m, a=1 to 20, —$C_nH_{2n}$—$NH_qR$—$C_pH_{2p}$—$(CH_mF_o)_a$—, with n=0 to 20, q=0 to 1, R=—$C_tH_{2t}$—, t=1 to 20, p=0 to 20, m=0 to 1, o=2−m, a=1 to 20, —$C_nH_{2n}$—$NH_qR$—$(CH_mF_o)_a$—$C_pH_{2p}$—, with n=0 to 20, q=0 to 1, R=—$C_tH_{2t}$—, t=1 to 20, p=0 to 20, m=0 to 1, o=2−m, a=1 to 20, —$C_nH_{2n}$—$NH_qAr^3$—$C_pH_{2p}$—$(CH_mF_o)_a$—, with n=0 to 20, q=0 to 1, $Ar^3$ being an aromatic ring system, p=0 to 20, m=0 to 1, o=2−m, a=1 to 20, and —$C_nH_{2n}$—$NH_qAr^3$—$(CH_mF_o)_a$—$C_pH_{2p}$—, with n=0 to 20, q=0 to 1, $Ar^3$ being an aromatic ring system, p=0 to 20, m=0 to 1, o=2−m, a=1 to 20.

Preferably, each of $Ar^1$, $Ar^2$, and $Ar^3$ is an aromatic ring system and is, at each occurrence independently selected from the group comprising phenyl, naphthyl, biphenyl, binaphthyl, terphenyl, anthracenyl, triptycyl, and heteroaromatic rings, with one or several heteroatoms in them selected from S, O and N, such as pyridyl, pyrimidyl, pyridazyl, thienyl and furanyl.

Preferably, each of $Ar^1$, $Ar^2$, and $Ar^3$, independently, is an aromatic ring system which is un-substituted or substituted with one or several substituents, wherein, preferably, at least one of $Ar^1$ and $Ar^2$ is substituted with one or several substituents.

Preferably said one or several substituents is/are selected from the group comprising Cl, F, Br, I, OH, $NH_2$, —$O(CH_2)_sCH_3$, —$(CH_2)_sCH_3$, —$(CH_2)$, —O—$(CH_2)_sCH_3$, —$(CH_2)$, —C(O)—$(CH_2)$, $CH_3$ with s=0 to 22, preferably 0 to 10, and n=0 to 20 preferably 0 to 10, —$CW_uH_{3-u}$ with W being selected from Cl, F, Br, and I, and u=1 to 3, —$(CH_2)$, —O—$CW_uH_{3-u}$, with W and u being as defined before, n=0 to 20, preferably 0 to 10

—$(CH_2)_n$—C(O)—$CW_uH_{3-u}$ with W and u being as defined before, n=0 to 20, preferably 0 to 10, —$CF_3$, —$OCF_3$, —CN, —$NO_2$, —NCS, —SCN, carboxylic acid and carboxylic acid ester.

In one embodiment $Ar^1$ and $Ar^2$ are each independently substituted with one or several substituents as defined above.

In one embodiment $Ar^1$ is substituted with at least two substituents as defined above, and $Ar^2$ is substituted with one substituent as defined above, wherein, preferably, $Ar^1$ is substituted with at least two substituents selected from F, Cl, Br, I, —$CF_3$, —$OCF_3$, —CN, —$NO_2$, —NCS, —SCN, carboxylic acid and carboxylic acid ester and $Ar^2$ is substituted with —$(CH_2)_sCH_3$, or —O—$(CH_2)_s$ $CH_3$ with s=0 to 22, preferably 0 to 10.

In one embodiment $Ar^1$ and $Ar^2$ are phenyl, X is O, CO or S, preferably O, $Ar^1$ is substituted with substituents in a substitution pattern selected from the following:

2- and 3-position; 2- and 4-position; 2- and 5-position; 2- and 6-position; 2-, 3- and 4-position; 2-, 3- and 5-position; 2-, 3- and 6-position; 2-, 4- and 5-position; 2-, 4- and 6-position; 3-, 4-, and 5-position; 2-, 3-, 4- and 5-position; 2-, 4-, 5- and 6-position; 2-, 3-, 5- and 6-position; and 2-, 3-, 4-, 5- and 6-position;

$Ar^2$ is at least substituted with a substituent in the 4-position wherein the substituents at $Ar^1$ are independently selected from F, Cl, Br, I, —$CF_3$, —CN, —$NO_2$, —NCS, —SCN, and the substituent at $Ar^2$ is —$CH_2)_sCH_3$ or —O—$(CH_2)_sCH_3$ with s=0 to 22, preferably 0 to 10.

In one embodiment X is O, $Ar^1$ is substituted with F in the 2-position and the 6-position, $Ar^2$ is substituted with $-(CH_2)_s CH_3$ in the 4-position with s=0 to 5, preferably 4, wherein, preferably, $Ar^2$ is substituted with $-C_5H_{11}$ in the 4-position.

In one embodiment $Ar^1$ is substituted with at least one substituent as defined above, and $Ar^2$ is not substituted, wherein, preferably, $Ar^1$ is substituted with at least one substituent selected from F, Cl, Br, I, $-CF_3$, $-CN$, $-NO_2$, $-NCS$, $-SCN$.

Preferably, $Ar^1$ and $Ar^2$ are phenyl, X is O, CO or S, preferably CO, $Ar^1$ is substituted with said at least one substituent in a substitution pattern selected from the following:

2-position; 3-position; 4-position; 5-position; 6-position; 2- and 3-position; 2- and 4-position; 2- and 5-position; 2- and 6-position; 2-, 3- and 4-position; 2-, 3- and 5-position; 2-, 3- and 6-position; 2-, 4- and 5-position; 2-, 4- and 6-position; 3-, 4-, and 5-position; 2-, 3-, 4- and 5-position; 2-, 4-, 5- and 6-position; 2-, 3-, 5- and 6-position; and 2-, 3-, 4-, 5- and 6-position;

wherein, preferably, X is CO and $Ar^1$ is substituted with F in the 4-position.

In one embodiment the amount of said at least one type of non-planar aromatic compound is, with respect to the total weight of the composition, 0.05% (w/w) to 20% (w/w), preferably 0.1% (w/w) to 10% (w/w).

In one embodiment said at least one type of liquid crystal is a liquid crystalline compound or a mixture of liquid crystalline compounds of the negative type.

In another embodiment said at least one type of liquid crystal is a liquid crystalline compound or a mixture of liquid crystalline compounds of the positive type.

In another embodiment said at least one type of liquid crystal is a liquid crystalline compound or a mixture of liquid crystalline compounds of the dual-frequency type.

In one embodiment said at least one type of liquid crystal is a liquid crystalline compound or a mixture of liquid crystalline and non-liquid crystalline compounds where the liquid crystalline compound is preferably selected from nematic liquid crystals.

The objects of the present invention are also solved by a liquid crystal cell comprising the composition according to the present invention, wherein, preferably, the liquid crystal cell according to the present invention comprises a front- and a backplane, on each or either of said front- and backplane an electrode or multiplicity of electrodes, on each of said electrodes and/or on said front- and backplane, a boundary surface consisting of either the electrode and/or the front- and backplane, or consisting of an additional layer or layers of materials on said electrode and/or on said front- and backplane, and between said boundary surfaces said composition according to the present invention.

In one embodiment the liquid crystal cell according to the present invention has a response time <80 ms, and/or a voltage holding ratio >80%, more preferably >90%, more preferably >96%.

Preferably, the liquid crystal cell according to the present invention is a polymer dispersed liquid crystal (PDLC), dichroic polymer dispersed liquid crystal (D-PDLC), sponge polymer dispersed liquid crystal (SPDLC), dichroic sponge polymer dispersed liquid crystal (D-SPDLC), wherein the composition according to the present invention has been used to prepare said cell.

The objects of the present invention are also solved by a liquid crystal display device, comprising the composition according to the present invention or comprising one or a multiplicity of interconnected or separate liquid crystal cells according to the present invention.

The objects of the present invention are also solved by a method of preparing the composition according to the present invention, wherein at least one non-planar aromatic compound, as defined above, is mixed with at least one type of liquid crystal as defined above.

The objects of the present invention are also solved by a method of preparing the liquid crystal cell according to the present invention, wherein the composition according to the present invention is used to fill a liquid crystal cell or D-SPDLC or SPDLC or D-PDLC or PDLC.

The present inventors have surprisingly found that by using non-linear or non-planar aromatic compounds, such as non-planar diaromatic compounds, it is possible to improve the response times of liquid crystal cells. Without wishing to be bound by any theory, the present inventors believe that doping of a liquid crystal with a non-planar aromatic compound decreases the rotational viscosity of the liquid crystal which is directly reflected as a reduction in the switching voltages and response times of a liquid crystal cell. An increased degree of non-planarity (tilt) of the dopants appears to have a positive effect on, i.e. a reduction of, the response times. The planarity of aromatic compounds may be influenced by the substitution pattern on such aromatic compound, the nature of the substituents and by the linkers between aromatic rings.

The term "non-planar", as used herein, in connection with an "aromatic compound", is meant to refer an arrangement of aromatic rings within a compound wherein there is more than one ring plane, and/or the different rings and their planes are tilted with respect to each other. The term "non-linear", as used herein, in connection with an "aromatic compound", is meant to refer an arrangement of aromatic rings within a compound which arrangement is not straight, but angular.

Aromatic ring systems useful in accordance with the present invention are for example, without being limited thereto, phenyl, naphthyl, biphenyl, binaphthyl, anthracenyl, triptycyl, and heteroaromatic rings having one or several heteroatoms in them (S, O or N) such as pyridyl, pyrimidyl, pyridazyl, pyridinyl, furyl, thienyl.

The term "substituted", as used herein is meant to refer to one or several of the hydrogen atoms present on an aromatic ring system or an aliphatic system being exchanged for another atom or group of atoms. Examples of suitable substituents are, without being limited thereto Cl, F, Br, I, OH, $NH_2$, $-O(CH_2)_n CH_3$, $-(CH_2)_n CH_3$, $-(CH_2)_n-C(O)-(CH_2)_s CH_3$ wherein s=0 to 22, preferably 0 to 10, and n=0 to 20 preferably 0 to 10, $-CY_m H_{3-m}$, wherein Y is selected from Cl, F, Br and I, m is from 1 to 3, said one or several substituents being preferably selected from $-CF_3$, $-CN$, $-NCS$, $-SCN$, $-NO_2$, $-COOH$, carboxylic acid ester, cyclohexyl, cyclohexenyl, cyclopentadienyl, cyclopentyl.

It should be noted that, whenever in this application indices in chemical formulae are used (denoted by small letters such as n, m, p, o, s etc.), these may take on integer values from the range quoted. Hence, if p is denoted as being "=0 to 20", p may be 0, 1, 2, 3, . . . 20. Likewise, if m is said to be "=0 to 1", m may be 0 or it may be 1.

The terms "positive type" and "negative type" when used in connection with a liquid crystal compound is meant to refer to the behavior of such a compound in a liquid crystal cell at a particular range of electric field driving frequencies. Liquid crystal compounds of the negative type means that the liquid crystal posses negative dielectric anisotropy at a given range of drive frequencies. They are most commonly orientated in such a manner within a liquid crystal cell when no external field is applied such that they align perpendicular to the boundary surfaces surrounding the liquid crystalline material. This type of alignment is also called homeotropic alignment. Liquid crystal compounds of the positive type means that the liquid crystal posses positive dielectric anisotropy at a given range of drive frequencies. They are most commonly orientated within a liquid crystal cell such that they are aligned parallel to the surrounding boundary surfaces when no external field is applied. This type of alignment is also called homogenous alignment in that the general alignment direction of the liquid crystal is parallel to the surrounding bounding surfaces. There is liquid crystal that can possess both positive and negative dielectric anisotropy depending on the range of drive frequencies. Such liquid crystals are called dual-frequency liquid crystal, and can be used in either homeotropic or homogeneous alignment.

The term "response time", as used herein, refers to the time required for a liquid crystal cell to align with a change in applied field. This is usually defined as the time from when the field is changed to the time when the transmission changes by 90% of the overall change. The 90% value is chosen because the gradient of the change in transmission is sufficiently different to zero, which is the not-measurable flat-line case when the transmission has changed fully by 100% of the desired transmission. Turn-on or Rise time is usually taken to be the time taken to respond to an increase in absolute magnitude of an applied field, whereas Turn-off or Fall or Decay time is usually taken to be the time taken to respond to a decrease in absolute magnitude of applied field. This can also be seen from FIG. 11.

The term "voltage holding ratio", as used herein, is meant to refer to the ratio between the electric charge stored on the cell integrated over a certain time (e.g. 16 ms) versus the electric charge stored on an ideal capacitor. It is a measure of the current leakage through the liquid crystal. The voltage holding ratio can be measured by observing the drop in voltage across the cell over a certain time; if a cell holds the voltage at a constant level then the voltage holding ratio is high. High voltage holding ratios equate to low current leakage, high voltage holding ratios are essential for displays with long lifetime and low levels of optical flicker.

The doping may be applicable to other LC modes such as TN, VA, IPS, PDLC (twisted nematic, vertical alignment, in-plane switching, polymer dispersed liquid crystal).

Polymer dispersed liquid crystal cells (PDLCs), dichroic polymer dispersed liquid crystal cells (DPDLCs), sponge polymer dispersed liquid crystal cells (SPDLCs) and dichroic sponge polymer dispersed liquid crystal cells (D-SPDLC) are known to someone skilled in the art and have for example been described in terms of their structure and process of manufacture in EP01129709, EP 02793010 and EP 02791826. The content of EP01129709, EP 02793010 and EP 02791826 is incorporated herein in its entirety by reference thereto. In such PDLCs, DPDLCs, SPDLCs, and D-SPDLC, in a transmission vs. voltage curve, usually a hysteresis can be observed that is, when the voltage is increased, the transmission follows a sigmoidal curve, and upon reduction of the voltage of the same cell again, the transmission again follows a sigmoidal curve which, however, is slightly shifted from the sigmoidal curve for increasing voltage. This phenomenon is termed "hysteresis". In a more specific sense, the term "hysteresis", as used herein in combination with a PDLC, DPDLC, SPDLC or D-SPDLC is defined as the difference in voltage between the voltage value at half maximum transmission, $T_{50}$, of said cell when the voltage is increasing and the voltage value at half maximum transmission, $T_{50}$, of said cell when the voltage is decreasing, on a transmission vs. voltage graph wherein $T_{50}$ is defined as $\frac{1}{2}(T_{max}+T_{min})$, wherein $T_{max}$ and $T_{min}$ are the maximum and minimum transmission achieved on said transmission vs. voltage graph.

A cell is a unit of a device and a method for confining the liquid crystal mixture such that fields can be applied to the mixture. A display device consists of one or more interconnected or separate cells.

The terms "E10" and "E90" refer to the electric fields applied to the cell for which 10% and 90% of the maximum optical transmission are respectively achieved. The term "V10" and "V90" refer to the respective voltage values at which 10% and 90% of the maximum trans-mission are achieved, respectively.

The present inventors have surprisingly found that by including in a liquid crystal composition at least one type of non-planar aromatic compound, it is possible to improve the response times of a liquid crystal cell substantially in comparison to a liquid crystal cell which comprises a liquid crystal composition that does not contain any dopant non-planar aromatic compound. The addition of such compounds to a liquid crystal composition results in reduced switching voltages and faster response times to applied electrical fields. Without wishing to be bound by any theory, the present inventors believe that the observed fact is due to a reduced viscosity and/or an increased dielectric anisotropy. In their neutral state, rod-like liquid crystal molecules, in particular rod-like nematic liquid crystal molecules, orient themselves parallel to the longitudinal axes of the adjacent molecules. The present inventors have succeeded in improving the switching behaviors of liquid crystals, in particular nematic liquid crystals, by changing their in-bulk organization through the addition of small amounts of non-planar aromatic compounds which, preferably are substituted, such as halogenated. The present inventors believe that such non-planar aromatic systems penetrate between the liquid crystal molecules, keeping individual molecules slightly apart without disturbing the overall orientation in the mixtures. A simple theoretical model explaining the present inventors' approach is shown in FIG. 1, where a halogenated diarylether molecule penetrates between two liquid crystalline molecules, increasing the separation between them. Such an approach increases the rotational viscosity of the liquid crystal mixtures since only small amounts, in the order of 0.1 to 20% (w/w) of non-planar aromatic dopants are used, and the overall effect is not a complete disorganization of the liquid crystal orientation. Therefore it appears as if the alignment on the boundary surfaces remains unaffected, and the black level and the contrast ratios remain undisturbed. The anisotropic character of the molecules according to the present invention adds to the anisotropy of the liquid crystal mixtures, and therefore mixtures are obtained that respond faster to applied electrical fields with lower rotational viscosity and undisturbed black levels. The advantage of using non-planar aromatic compounds is also seen in the lower driving voltages.

In the following, reference is made to the figures wherein

Figure 2:
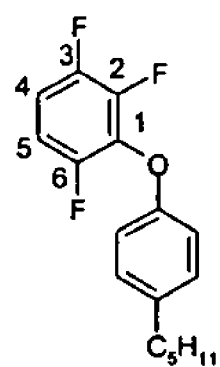
Figure 2:
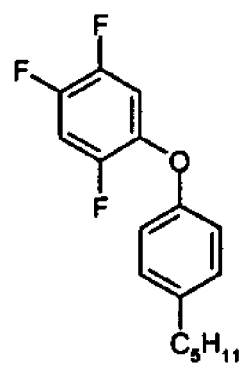
Figure 2:
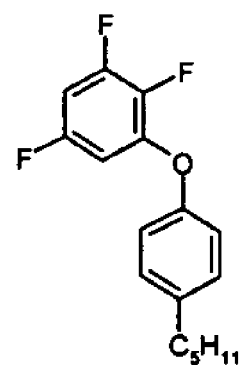
Figure 3:
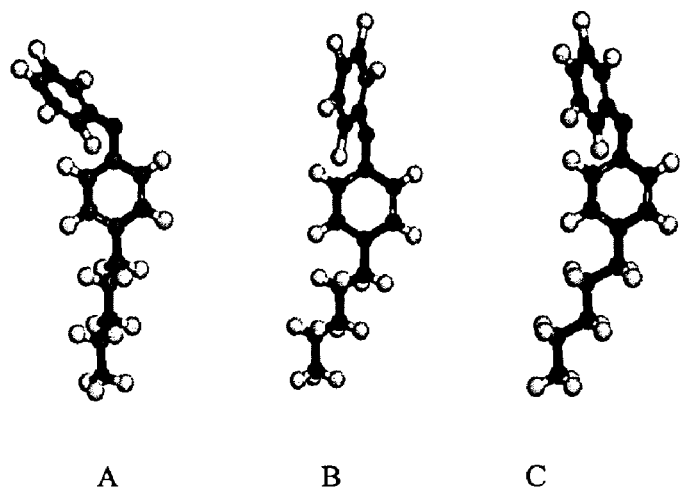
Figure 3:
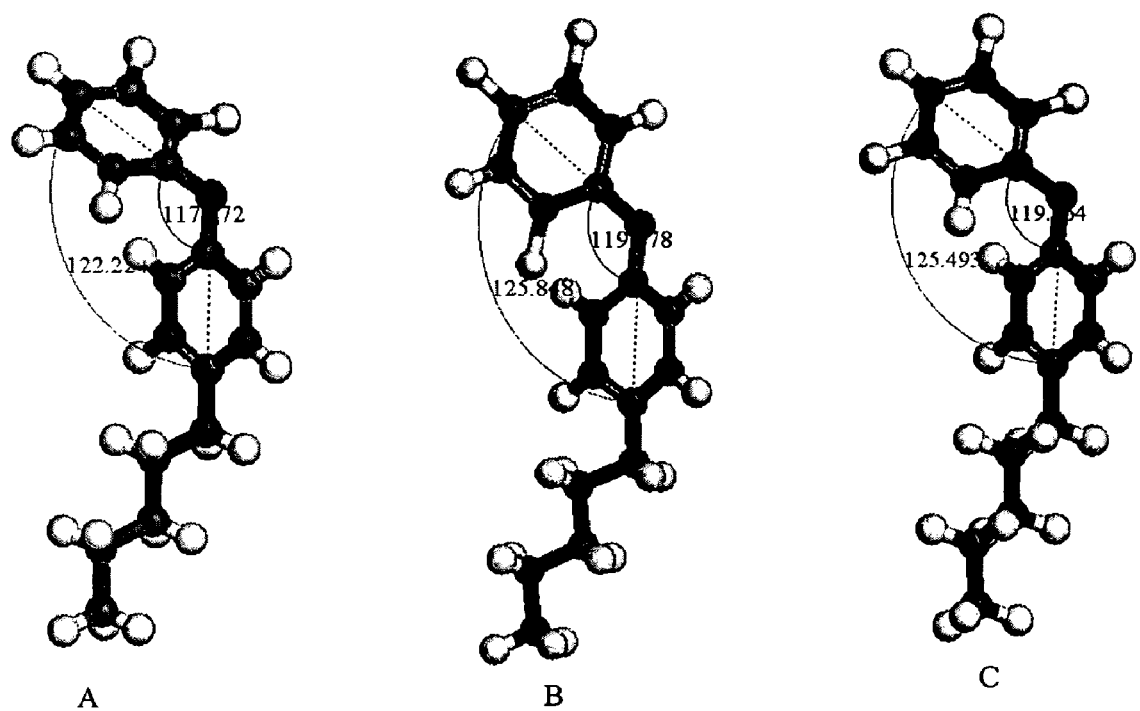
Figure 4:
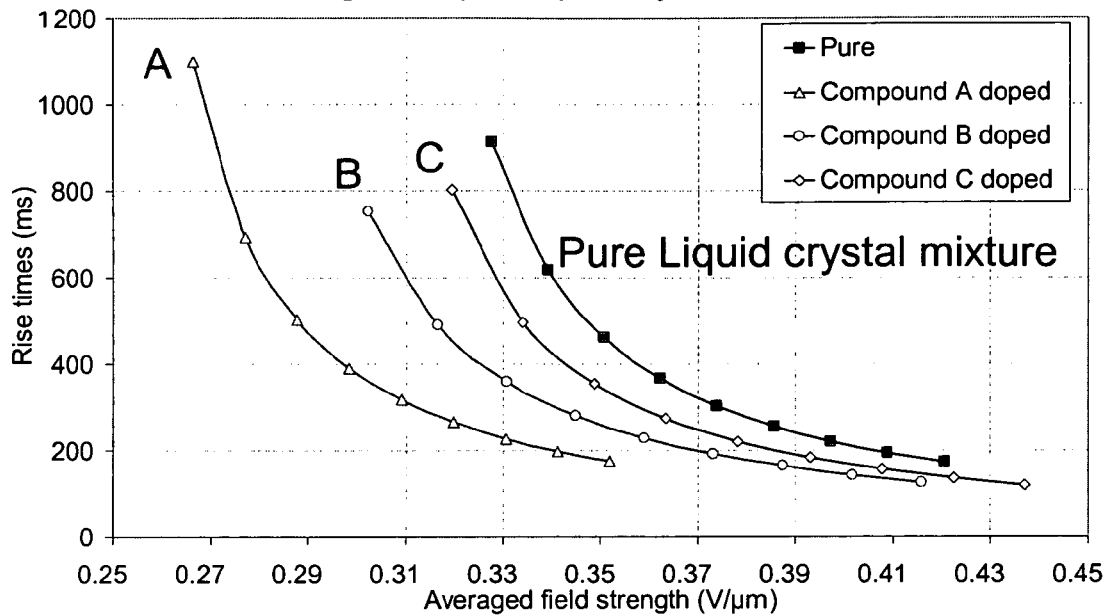
Figure 5:
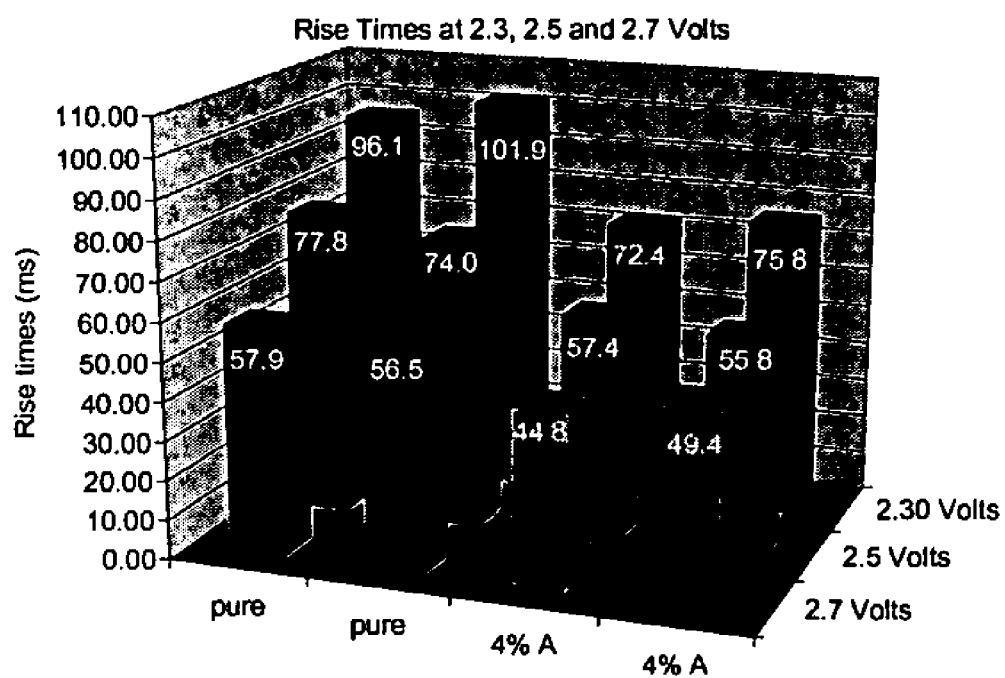
Figure 6:
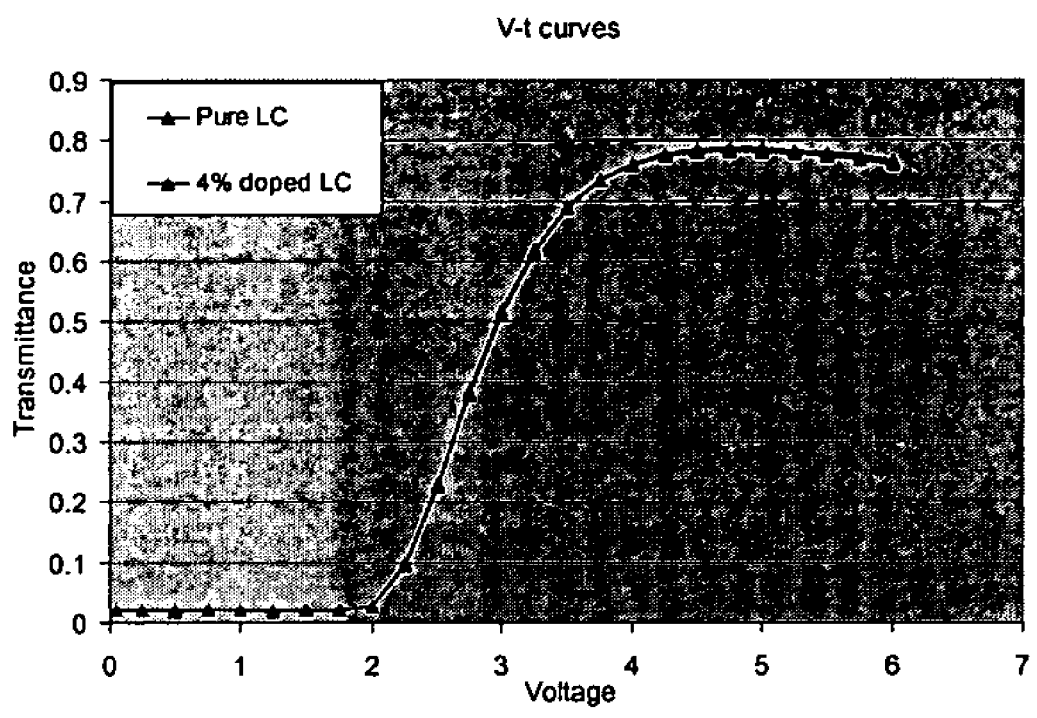
Figure 7:
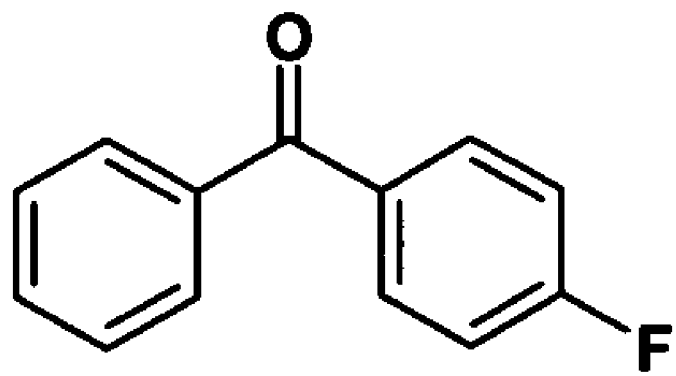
Figure 7:
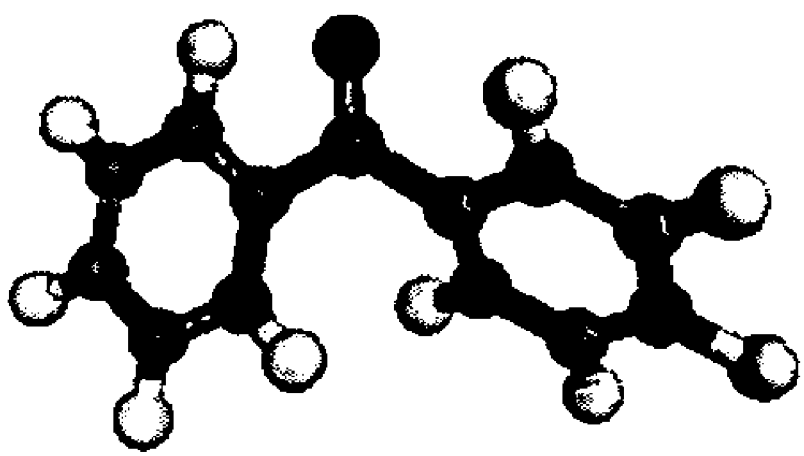
Figure 8:
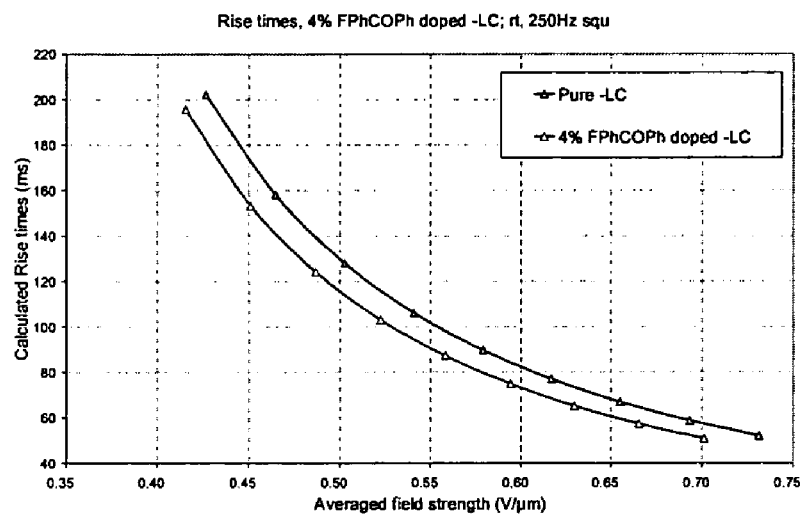
Figure 8:
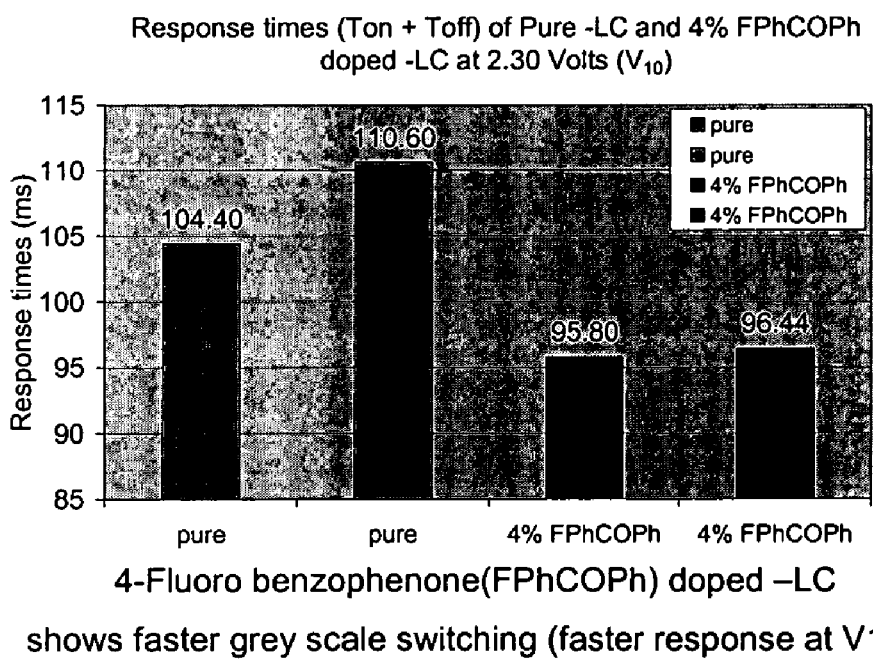
Figure 9:
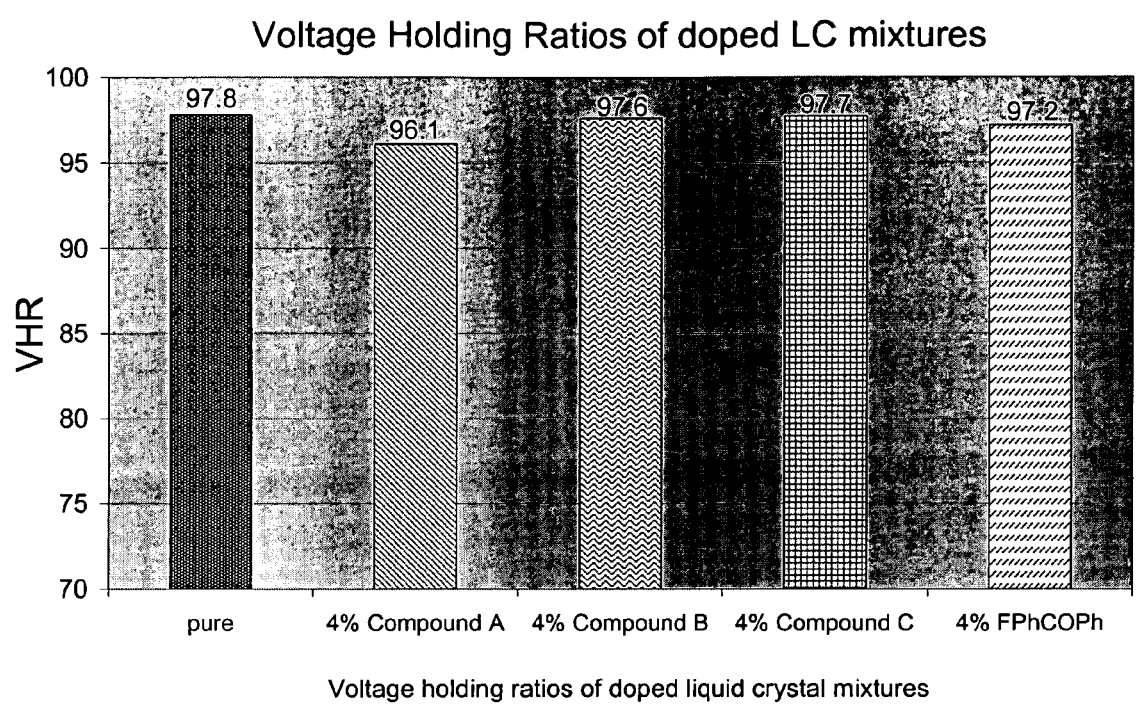
Figure 10:
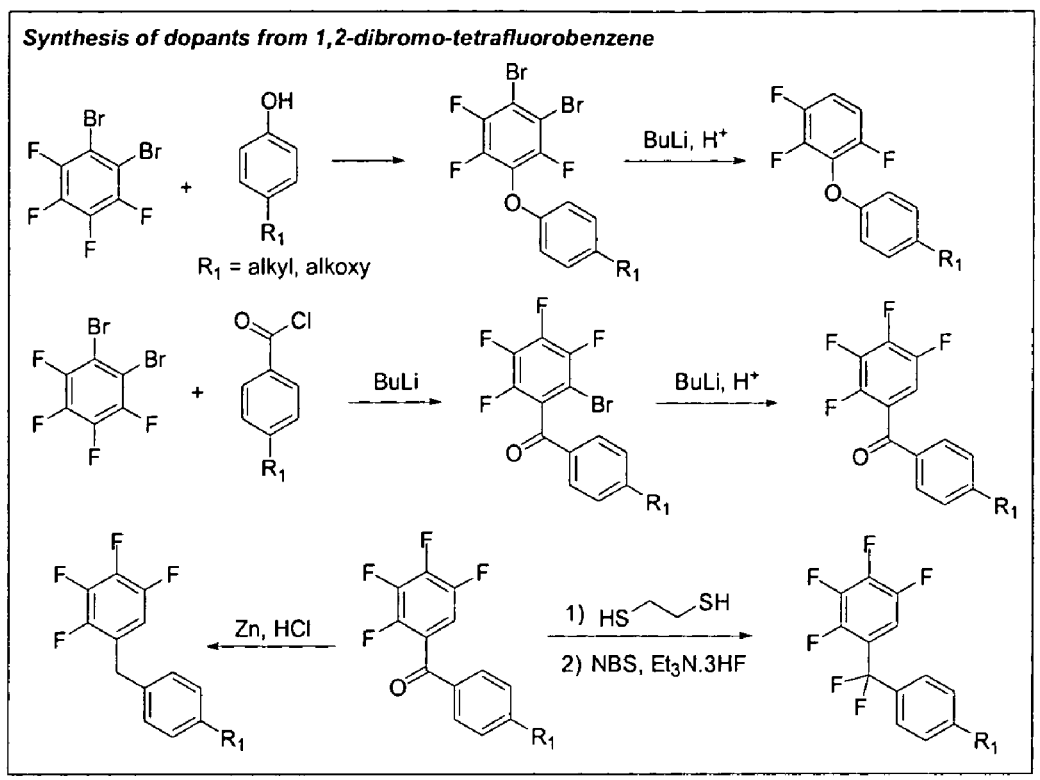
Figure 11:
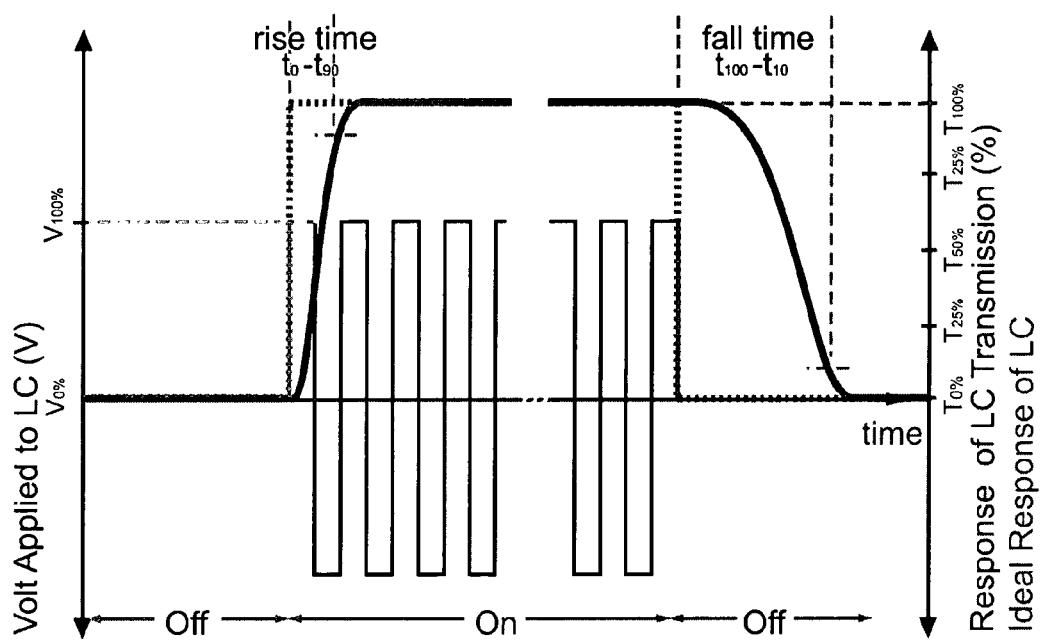

FIG. 1 shows a theoretical model which simulates a halogenated diarylether molecule penetrating between two liquid crystal molecules and separating them slightly, FIG. 2 shows three different diarylethers with different substitution patterns, FIG. 3 shows geometry optimized structures of three diarylether derivatives: compound A is the most non-planar, FIG. 4 shows the doping of liquid crystal cells with compounds A, B and C of FIG. 3; compound A results in the fastest response times, FIG. 5 shows an improved grey scale switching of liquid crystal cells by doping with compound A, FIG. 6 shows the effect of doping with compound A on the transmittance and the change in the black level; no change in the black level can be observed;

FIG. 7 shows another compound according to the present invention, namely the non-planar 4-fluorobenzophenone (FPhCOPh), FIG. 8, panel A, shows that 4-fluorobenzophenone (FPhCOPh) doped liquid crystal cells have faster rise times than liquid crystal cells without such dopant, FIG. 8, panel B, shows that 4-fluorobenzophenone (FPhCOPh) doped liquid crystal cells have faster grey scale switching, i.e. a faster response at V10, FIG. 9 shows the voltage holding ratio (VHR) of liquid crystal mixtures which are doped with different diarylethers A, B and C and also with 4-fluorobenzophenone (FPhCOPh), FIG. 10 shows different synthesis schemes for compounds in accordance with the present invention, and FIG. 11 shows a graph summarizing different types of response times.

Moreover, reference is made to the following examples which are given to illustrate, not to limit the present invention:

EXAMPLES

Example 1

The non-planar aromatic compounds that are useful in accordance with the present invention, may be synthesized using standard organic synthetic chemistry. Typical synthetic schemes for the synthesis of multiply halogenated dye-aromatic compounds are shown in FIG. 10. Different metal catalyzed coupling reactions, like for example a derivative of Ullman type reaction can very effectively be used. [Ref. Organic Letters, 2004, Vol. 6, No. 6, 913-916]. The entire contents of this reference is incorporated herein by reference thereto.

Example 2

1 to 6 weight % of a non-planar diaromatic compound was mixed with commercially available negative or positive type liquid crystal mixtures and stirred at 60° C. for one hour. The mixture was either capillary filled or filled in a vacuum oven into 4, 5 or 10 µm thick, parallel or homeotropically aligned test cells with polyimide (PI) or cetyl trimethyl ammonium bromide (CTAB) alignment layers. The filled cells were annealed between 30 minutes to 2 hours depending on the liquid crystalline material used and at 10° C. higher temperatures than the nematic-isotropic transition temperatures. The cells were allowed to cool gradually and the response and transmittance profiles were measured at 25 and 35° C. using an optical microscope.

The degree of non-planarity (tilt) of dopant molecules plays an important role on the improvement of response speeds. FIG. 2 shows three different diarylether derivatives A, B, and C where the positions of fluorine substituents are changed. The geometry optimized structures shown in FIG. 3 base on DFT (density functional theory) and were calculated using Accelrys Material Studio Modeling 4 software, DMol3 program. As can be followed from FIG. 4, compound A, which has the highest degree of non-planarity (most tilted or with the largest tilt) due to the two fluorine substituents which are attached at the $2^{nd}$ and $6^{th}$ positions of the phenyl ring shows the fastest response times. It should be noted that, in FIG. 4, only non-ideal cells were used, and hence, on an absolute level, the rise times are exceptionally long. At the same time, it is also clear from FIG. 4, that in the set-up used doping with compounds A, B or C improves these rise times. Compound A gives the best improvement. However, the present inventors envisage that if a better set-up is used, i.e. better cells, the rise times can be substantially improved without any problems to reach values <80 ms, or even <40 ms-<20 ms. However, FIG. 4 suffices to prove the principle that doping with non-planar compounds in accordance with the present invention improves the rise times dramatically within a given set-up. In FIG. 5 results are shown where the grey scale switching speed of the negative-type LC (-LC) mixture is increased upon doping with compound A. FIG. 6 shows the black level of the pure LC and compound A doped LC mixtures. As is clearly seen there is no detrimental change taking place upon addition of non-planar aromatic compounds. In FIG. 7 a different type of non-planar aromatic compound is shown, namely the 4-fluorobenzophenone which again improves the response times of the liquid crystal mixtures, FIG. 8. FIG. 9 shows the voltage holding ratios of different dopants in LC mixtures.

In summary, using compositions in accordance with the present invention, the liquid crystal cell properties can be dramatically improved. It is currently believed, that the non-planar structures of the dopant molecules reduce the viscosity of the liquid crystals which, in turn, results in faster turn-on- and turn-off-responses to applied electrical fields. Moreover, the doping also reduces the switching voltages, and the resulting dopant-liquid crystal mixtures have excellent voltage holding ratios which are larger than 96%. The dopant molecules in accordance with the present invention are non-volatile at the filling temperatures of the liquid crystal cells and also at the operation temperatures of liquid crystal display devices. Moreover, the dopant molecules in accordance with the present invention have low electrical conductivities which make them particularly suitable for use in such liquid crystal compositions.

The features of the present invention disclosed in the specification, the claims and/or in the accompanying drawings, may, both separately, and in any combination thereof, be material for realizing the invention in various forms thereof.

The invention claimed is:

1. A composition comprising:
at least one liquid crystal; and
at least one non-planar aromatic compound represented by the following formula (1):

$$Ar^1—X—Ar^2 \qquad (1)$$

wherein $Ar^1$ is a phenyl moiety substituted with two or more substituents independently selected from the group consisting of F, Cl, Br, I, —$CF_3$, —CN, —$NO_2$, —NCS, and —SCN, and wherein the phenyl moiety of $Ar^1$ has a substitution pattern selected from the group consisting of:
2- and 3-position; 2- and 4-position; 2- and 5-position; 2- and 6-position; 2-, 3- and 4-position; 2-, 3- and 5-position; 2-, 3- and 6-position; 2-, 4- and 5-position; 2-, 4- and 6-position; 3-, 4-, and 5-position; 2-, 3-, 4- and 5-position; 2-, 4-, 5- and 6-position; 2-, 3-, 5- and 6-position; and 2-, 3-, 4-, 5- and 6-position;
wherein X is selected from the group consisting of O, CO and S; and
wherein $Ar^2$ is a phenyl moiety substituted with at least one substituent independently selected from the group consisting of —$(CH_2)_sCH_3$ and —$O(CH_2)_sCH_3$, wherein s is an integer of from 0 to 22, and wherein the phenyl moiety of $Ar^2$ is at least substituted with the substituent at the 4-position.

2. The composition according to claim 1, wherein the phenyl moiety of $Ar^1$ is substituted with two substituents and has a substitution pattern selected from the group consisting of: 2- and 3-position; 2- and 4-position; 2- and 5-position; and 2- and 6-position.

3. The composition according to claim 2, wherein the phenyl moiety of $Ar^1$ is substituted with two substituents independently selected from the group consisting of F, Cl, Br, I, and —$CF_3$.

4. The composition according to claim 1, wherein the phenyl moiety of $Ar^1$ is substituted with three substituents and has a substitution pattern selected from the group consisting of: 2-, 3- and 4-position; 2-, 3- and 5-position; 2-, 3- and 6-position; 2-, 4- and 5- position; 2-, 4- and 6-position; and 3-, 4-, and 5-position.

5. The composition according to claim 4, wherein the phenyl moiety of $Ar^1$ is substituted with three substituents independently selected from the group consisting of F, Cl, Br, I, and —$CF_3$.

6. The composition according to claim 1, wherein the phenyl moiety of $Ar^1$ is substituted with four substituents and has a substitution pattern selected from the group consisting of: 2-, 3-, 4- and 5-position; 2-, 4-, 5- and 6-position; 2-, 3-, 5- and 6-position; and 2-, 3-, 4-, 5- and 6-position.

7. The composition according to claim 6, wherein the phenyl moiety of $Ar^1$ is substituted with four substituents independently selected from the group consisting of F, Cl, Br, I, and —$CF_3$.

8. The composition according to claim 1, wherein the phenyl moiety of $Ar^1$ is substituted with at least one substituent independently selected from the group consisting of —CN, —$NO_2$, —NCS, and —SCN.

9. The composition according to claim 1, wherein X is O.

10. The composition according to claim 1, wherein X is CO.

11. The composition according to claim 1, wherein X is S.

12. The composition according to claim 1, wherein the phenyl moiety of $Ar^2$ is substituted at the 4-position with —$(CH_2)_sCH_3$, wherein s is an integer of from 0 to 10.

13. The composition according to claim 1, wherein the phenyl moiety of $Ar^2$ is substituted at the 4-position with —$O(CH_2)_sCH_3$, wherein s is an integer of from 0 to 10.

14. The composition according to claim 1,
wherein the phenyl moiety of $Ar^1$ is substituted with two or more substituents independently selected from the group consisting of F, Cl, Br, and I, and wherein the phenyl moiety of $Ar^1$ has a substitution pattern selected from the group consisting of: 2- and 3-position; 2- and 4-position; 2- and 5-position; 2- and 6-position; 2-, 3- and 4-position; 2-, 3- and 5-position; 2-, 3- and 6-position; 2-, 4- and 5-position; 2-, 4- and 6-position; 3-, 4-, and 5-position; 2-, 3-, 4- and 5-position; 2-, 4-, 5- and 6-position; 2-, 3-, 5- and 6-position; and 2-, 3-, 4-, 5- and 6-position;
wherein X is O; and
wherein the phenyl moiety of $Ar^2$ is substituted with at least one substituent independently selected from the group consisting of —$(CH_2)_sCH_3$ and —$O(CH_2)_sCH_3$, wherein s is an integer of from 0 to 10, and wherein the phenyl moiety of $Ar^2$ is at least substituted with the substituent at the 4-position.

15. The composition according to claim 1,
wherein the phenyl moiety of $Ar^1$ is substituted with F substituents and has a substitution pattern selected from the group consisting of: 2- and 3-position; 2- and 4-position; 2- and 5- position; 2- and 6-position; 2-, 3- and 4-position; 2-, 3- and 5-position; 2-, 3- and 6-position; 2-, 4- and 5-position; 2-, 4- and 6-position; 3-, 4-, and 5-position; 2-, 3-, 4- and 5-position; 2-, 4-, 5- and 6-position; 2-, 3-, 5- and 6-position; and 2-, 3-, 4-, 5- and 6-position;
wherein X is O; and
wherein the phenyl moiety of $Ar^2$ is substituted with at least one substituent independently selected from the group consisting of —$(CH_2)_sCH_3$ and —$O(CH_2)_sCH_3$, wherein s is an integer of from 0 to 5, and wherein the phenyl moiety of $Ar^2$ is at least substituted with the substituent at the 4-position.

16. The composition according to claim 1, wherein the phenyl moiety of $Ar^1$ is substituted with F substituents and has a substitution pattern selected from the group consisting of: 2-, 3- and 5-position; 2-, 3- and 6-position; and 2-,4- and 5-position; wherein X is O; and wherein the phenyl moiety of $Ar^2$ is substituted at the 4-position with —$(CH_2)_4CH_3$.

17. The composition according to claim 1, wherein the at least one non-planar aromatic compound is present in an amount of 0.05-20 wt. %, based on a total weight of the composition.

18. The composition according to claim 1, wherein the at least one liquid crystal is a liquid crystalline compound or a mixture of liquid crystalline compounds possessing negative dielectric anisotropy.

19. The composition according to claim 1, wherein the at least one liquid crystal is a liquid crystalline compound or a mixture of liquid crystalline compounds possessing positive dielectric anisotropy.

20. The composition according to claim 1, wherein the at least one liquid crystal is a liquid crystalline compound or a mixture of liquid crystalline compounds possessing both positive and negative dielectric anisotropy depending on the range of electric field drive frequency.

21. The composition according to claim 1, wherein the at least one liquid crystal is a liquid crystalline compound or a mixture of liquid crystalline and non-liquid crystalline compounds, wherein the liquid crystalline compound is a nematic liquid crystal.

22. A liquid crystal cell comprising the composition according to claim 1.

23. The liquid crystal cell according to claim 22, which comprises a front- and a backplane, on each or either of said front- and backplane an electrode or multiplicity of electrodes, on each of said electrodes and/or on said front- and backplane, a boundary surface consisting of either the electrode and/or the front- and backplane, or consisting of an additional layer or layers of materials on said electrode and/or on said front- and backplane, and between said boundary surfaces said composition comprising at least one liquid crystal and at least one non-planar aromatic compound.

24. The liquid crystal cell according to claim 22, which has a rise time of <80 ms, and/or a voltage holding ratio of >80%.

25. The liquid crystal cell according to claim 22, wherein the liquid crystal cell is selected from the group consisting of a polymer dispersed liquid crystal cell (PDLC), a dichroic polymer dispersed liquid crystal cell (D-PDLC), a sponge polymer dispersed liquid crystal cell (SPDLC), and a dichroic sponge polymer dispersed liquid crystal cell (D-SPDLC).

26. A liquid crystal display device comprising the composition according to claim 1, or one or more interconnected or separate liquid crystal cells comprising the composition according to claim 1.

27. A method of preparing the composition according to claim 1, wherein the method comprises mixing the at least one non-planar aromatic compound with the at least one liquid crystal.

28. A method of preparing a liquid crystal cell, wherein the method comprises filling the liquid crystal cell or D-SPDLC or SPDLC or D-PDLC or PDLC with the composition according to claim 1.

* * * * *